United States Patent
Zitzmann et al.

(10) Patent No.: US 7,394,994 B2
(45) Date of Patent: Jul. 1, 2008

(54) OPTICAL RECEIVER CIRCUIT

(75) Inventors: Joost Maarten Zitzmann, Nijmegen (NL); Freek Egbert Van Straten, Nijmegen (NL)

(73) Assignee: NXP B.V., Eindhoven (NL)

(*) Notice: Subject to any disclaimer, the term of this patent is extended or adjusted under 35 U.S.C. 154(b) by 543 days.

(21) Appl. No.: 10/520,314

(22) PCT Filed: Jul. 1, 2003

(86) PCT No.: PCT/IB03/02989

§ 371 (c)(1),
(2), (4) Date: Jan. 5, 2005

(87) PCT Pub. No.: WO2004/008667

PCT Pub. Date: Jan. 22, 2004

(65) Prior Publication Data

US 2005/0281564 A1 Dec. 22, 2005

(30) Foreign Application Priority Data

Jul. 11, 2002 (EP) .................................. 02077834

(51) Int. Cl.
*H04B 10/06* (2006.01)

(52) U.S. Cl. .................... 398/202; 398/206; 398/208; 398/210; 330/254; 333/81 R; 359/337.1; 385/140

(58) Field of Classification Search .................. 398/202, 398/210, 206, 208; 455/249.1; 333/81 R; 327/308; 330/254; 359/337.1; 385/140
See application file for complete search history.

(56) References Cited

U.S. PATENT DOCUMENTS

| | | | | |
|---|---|---|---|---|
| 5,448,207 A | 9/1995 | Kohama | ................... | 333/81 R |
| 5,563,557 A * | 10/1996 | Sasaki | ....................... | 333/81 R |
| 5,694,069 A * | 12/1997 | Kasashima et al. | .......... | 327/179 |
| 5,796,286 A * | 8/1998 | Otaka | .......................... | 327/308 |
| 5,898,347 A * | 4/1999 | Harford | ..................... | 333/17.1 |
| 5,969,561 A * | 10/1999 | McGillan | ..................... | 327/308 |
| 6,337,974 B1 * | 1/2002 | Inamori et al. | .............. | 455/126 |
| 6,489,856 B1 * | 12/2002 | Weigand | ................... | 333/81 R |
| 6,865,016 B2 * | 3/2005 | Sugaya et al. | ............. | 359/337.1 |
| 2002/0122233 A1* | 9/2002 | Imajo | .......................... | 359/189 |
| 2003/0090320 A1* | 5/2003 | Skrobko et al. | ............. | 330/195 |
| 2004/0253003 A1* | 12/2004 | Farmer et al. | ................ | 398/214 |

FOREIGN PATENT DOCUMENTS

| | | |
|---|---|---|
| JP | 07-087024 | 3/1995 |
| JP | 07-249954 | 9/1995 |
| JP | 10-173464 | 6/1998 |

* cited by examiner

*Primary Examiner*—Kenneth Vanderpuye
*Assistant Examiner*—Phyowai Lin
(74) *Attorney, Agent, or Firm*—Peter Zawilski

(57) ABSTRACT

An optical receiver circuit comprising an optical converter circuit (38), comprising a photodiode and converting optical power into electrical power, a sensor circuit for deriving a control voltage VCONTR as a characteristic value of the electrical power output by the optical converter circuit (38); and an attenuator circuit (44) having a variable attenuation, the attenuation being controlled by the characteristic value of the electrical power output by the sensor circuit so as to obtain a constant output signal level of the optical receiver circuit. An output circuit is also provided and comprises a matching network (46), an amplifier stage (48) and an output transformer (50).

16 Claims, 4 Drawing Sheets

OPTICAL RECEIVER CIRCUIT

The invention relates to an optical receiver circuit, in particular to an optical receiver circuit for CATV applications.

In the state of the art there are several attenuators well known for the attenuation of an electrical signal. U.S. Pat. No. 5,448,207 discloses an attenuator circuit which has a small insertion loss and also a broad tolerance with regard to the fluctuation of the element parameter. An attenuator stage having the largest attenuation factor from among a plurality of attenuator stages is formed with a Π-type attenuator stage, and an attenuator stage having the smallest attenuation factor from among the plurality of attenuator stages is formed with a T-type attenuator stage. In this way, an attenuator stage having a large attenuation factor whose precision tends to vary is formed with a Π-type attenuator stage so that the precision becomes high; furthermore, an attenuator stage having a small attenuation factor is formed with a T-type attenuator stage so that the insertion loss can be lowered. This circuit is a so-called characteristic impedance network. This means that the input and output impedance of this attenuation circuit are constant, irrespective of the attenuation setting, and equal to the source and load impedance so as to have a good matching function.

U.S. Pat. No. 5,563,557 discloses an attenuator device comprising a unit step attenuator having a switch, an attenuation resistor connected in parallel to the switch and two termination resistors. Three current source circuits are provided, having three transfer gates and three current source FETs for controlling a gate current of the switch FET. The signal transmission loss and the layout area can be minimized, even if various attenuation rates are required. This circuit is also a characteristic impedance network. As described above, this means that the input and output impedance of this attenuation circuit are constant. U.S. Pat. No. 5,563,557 deals with the signal transmission source, the frequency characteristic of the circuit and the attenuation rate of the circuit.

JP-A-10-173464 discloses a step attenuator directed to minimizing a phase shift in a through state and an attenuation state. This attenuator is composed of resistors, a MOSFET and a phase-compensating circuit which includes resistors corresponding to an input terminal, an output terminal and control terminals, the resistors and the FET forming an attenuation switch setting circuit. The amount of shift between a passing phase at the time of passing operation and at the time of attenuation operation is minimized via a control signal applied to the control terminal of the attenuation switch setting circuit and the control terminal of the phase compensating circuit.

JP-A-07-249954 provides a step attenuator which is reduced in respect of insertion loss and circuit size and has a good performance for IC integration for a step attenuator capable of stepwise changing the factor of attenuation to a required value. Several FET switches for passing/interrupting an input signal are connected between an input terminal and an output terminal and fixed attenuators with optional attenuation values are arranged in parallel with switches. Such circuits are connected in cascade, respective FET switches being selectively turned on/off so as to obtain a required attenuation value. Since the total number of switches and the number of signal passing switches can be reduced as compared with a conventional attenuator, this step attenuator can be realized on a smaller chip area and has a smaller insertion loss.

JP-A-07-087024 discloses an optical receiver intended to extend the dynamic range of the optical receiver by suppressing deterioration in the optical receiver, such as distortion of the output of the receiver, when the power of light received is high. A step attenuator is added to a pre-stage of a first stage amplifier and a variable attenuator is added to a post-stage. The input level of the first stage amplifier is attenuated by decreasing the attenuation of the step attenuator when the power of the received light is small and by increasing the attenuation of the step attenuator when the power of the received light is high, thereby suppressing the distortion produced as a stage amplifier.

JP-A-10-173464, JP-A-07-249954 and JP-A-07-087024 are also conceived for fixed input and output impedances.

In a conventional CATV system (Common Antenna Television System), the system receives the information signals from an antenna unit connected to the head-end which converts the electrical signals into optical signals and sends the optical signals, via a transmitter, through a glass-fiber cable to the primary hub. The primary hub receives the optical signal from the head-end and transmits it to a secondary hub which converts the optical signal into a RF-signal. The RF-signal is transmitted, via a coaxial cable, to the consumers. The problem with such a system is that commonly used gain control circuits, used in optical receivers, distort the information signals. Therefore, several investigations have been done to reduce such distortion in the optical receiver.

It is an object of the invention to provide an optical receiver circuit which has been improved with respect to intermodulation distortion and provides a constant output signal level.

In order to achieve this object, an optical receiver circuit in accordance with the invention comprises an optical converter circuit converting optical power into electrical power, a sensor circuit detecting a characteristic value of the electrical power, an attenuator circuit having a variable attenuation, the attenuation being controlled by the characteristic value of the electrical power output by the sensor circuit so as to obtain a constant output signal level of the optical receiver circuit, and an output circuit. A distortion-free, automatic gain control circuit can be realized by sensing the optical input signal level and switching the attenuator circuit to the output of the sensor circuit. This optical receiver circuit has a substantially reduced intermodulation distortion and is, therefore, particularly suitable for a CATV optical receiver.

According to a preferred embodiment of the invention, the optical converter circuit comprises a photo-diode. This has proven to be the best possible way of converting optical power into electric power.

According to a further preferred embodiment of the invention, the sensor circuit comprises a resistor network connected to the optical converter circuit in order to derive a control voltage $V_{CONTR}$ as a characteristic value of the electrical power output by the optical converter circuit. Such a resistor network, connected to the optical converter circuit, is a reliable and simple means of deriving the control voltage $V_{CONTR}$ as a characteristic value of the electric power output.

According to a further preferred embodiment of the invention, the attenuator circuit is a step attenuator circuit comprising a plurality of attenuator stages which can be selectively switched to active states. By selectively switching individual attenuator stages, either one by one or in groups, to active states, a wide variety of attenuation values can advantageously be obtained with a minimum number of attenuator stages.

According to a further preferred embodiment of the invention, the sensor circuit comprises an A/D converter converting the control voltage $V_{CONTR}$ into a digital signal controlling the attenuator stages of the attenuator circuit. A distortion-free, automatic gain control circuit can advantageously be realized by sensing the optical input signal level with the input of an A/D converter and switching the attenuator circuits via the output of the A/D-converter.

According to a further preferred embodiment of the invention, the respective attenuator stages each have a different attenuation value. By selectively switching individual attenuator stages, having a respective different attenuation value to active states, either one by one or in groups, the range of the attenuation values can advantageously be further expanded while using a minimum number of attenuator stages.

According to a further preferred embodiment of the invention, the attenuator stages are T-type attenuator stages comprising a resistor and a semiconductor switch in series with the resistor. The insertion loss can advantageously be lowered, by means of a T-type attenuator stage.

According to a further preferred embodiment of the invention, the attenuator stages are T-type attenuator stages comprising two resistors and a semiconductor switch in series with the resistors, one of the resistors being bridged by another semiconductor switch. This advantageously allows variation of the attenuation factor of one and the same attenuation stage.

According to a further preferred embodiment of the invention, capacitors are provided for separating respective input ends of the attenuator stages, and also an input capacitor for coupling the input end of said attenuator stages to an output of the optical receiver circuit and an output capacitor for coupling an output of the attenuator circuit to the output circuit.

According to a further preferred embodiment of the invention, the semiconductor switches are MOSFETs which can be advantageously controlled by the outputs of, for example, an A/D converter and which also have advantages in respect of integration on a chip.

According to a further preferred embodiment of the invention, the output circuit comprises a matching network, an amplifier stage and an output transformer which advantageously complete the optical receiver circuit.

These and various other advantages and features of novelty which characterize the present invention are elucidated in the attached claims. However, for a better understanding of the invention, its advantages, and the object obtained by its use, reference is made to the accompanying drawings and the following description illustrating preferred embodiments of the present invention.

Figure 1:
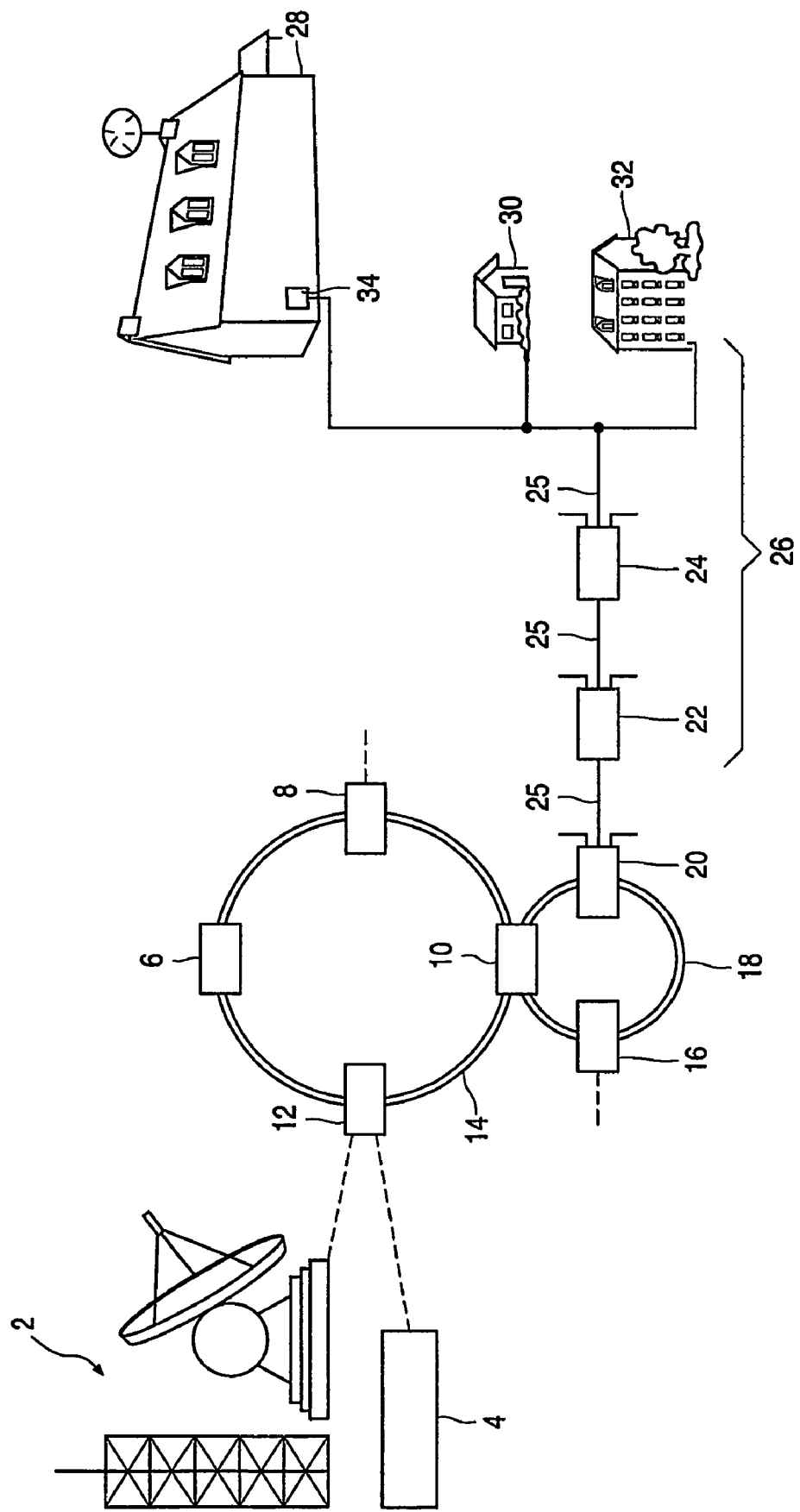
FIG. 1 shows a contemporary CATV system.

FIG. 1 shows a diagram of a contemporary CATV system. The system receives information signals from an antenna unit 2 and/or a network backbone 4. The antenna unit 2 and/or the network backbone 4 are connected to the head-end 12. The head-end 12 converts all signals into optical signals and sends the optical signals, via a glass-fiber cable, a so-called fiber backbone 14, to primary hubs 6, 8 and 10. The primary hubs 6, 8 or 10 receive the optical signals from the head-end 12 and transmit the optical signals, via a secondary ring 18, a so-called fiber ring, to secondary hubs 16, 20.

The secondary hubs or optical receiver circuits 16,20 receive the optical signals from the primary hubs and convert the optical signals into an RF-signal. The RF-signal is transmitted via a coaxial cable 25 and RF-amplifiers 22, 24, that is, via a so-called last mile 26, to the consumers, i.e. houses 28, 30, 32. The houses are provided with residential gateways and in-house communication networks. This is shown in principle in the house 28 which comprises a residential gateway 34. For instance, a computer, telephone and game gear are coupled to the residential gateway 34 for in-house communication and communication with the outside world.

Figure 2:
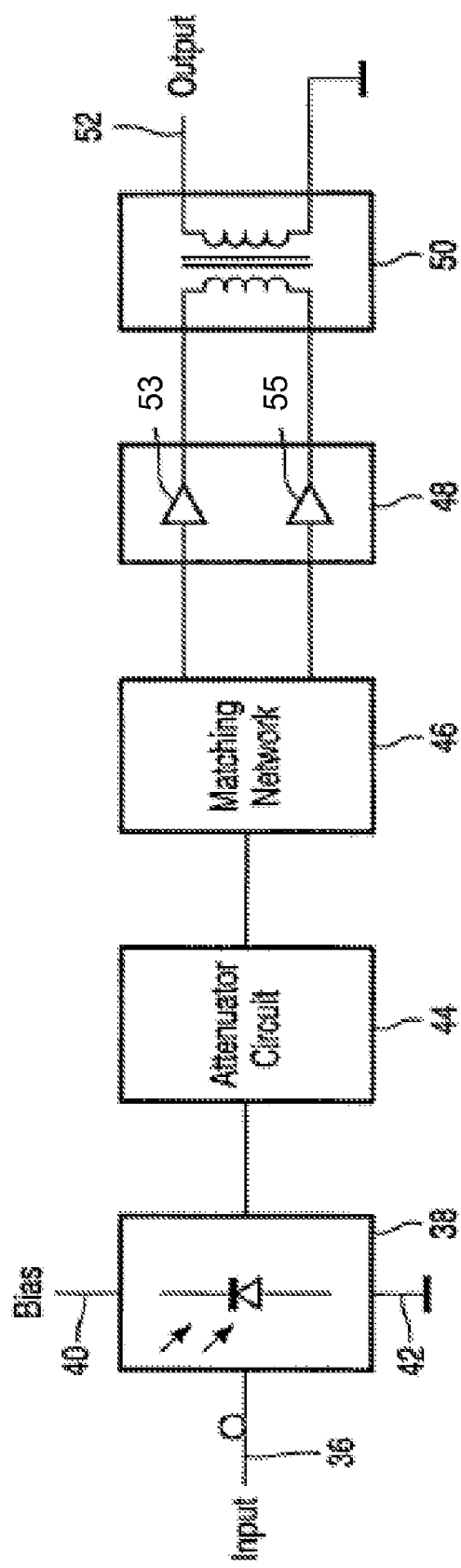
FIG. 2 shows a block diagram of an optical receiver unit.

FIG. 2 shows a block diagram of an optical receiver circuit. The optical receiver circuit, for example, the optical receiver circuit 20, receives the optical signal via an input terminal 36. The input terminal 36 is connected to an optical converter circuit 38. The optical converter circuit 38 is connected to a bias voltage by way of a terminal 40 and to ground by way of a terminal 42. The optical converter circuit 38 converts the optical signal into an electrical signal. The optical converter circuit 38 comprises a photodiode to convert the optical signal into an electrical signal.

The electrical signal of the optical converter circuit 38 is transmitted to an attenuator circuit 44. The attenuator circuit 44 attenuates the electrical signal of the optical converter circuit 38 in order to provide constant signal levels at its output which leads to a matching network 46. The matching network 46 matches the output of the attenuator circuit 44 to an amplifier stage 48. The amplifier stage 48 comprises two amplifiers 53, 55 in order to amplify the output signal of the matching network for an output transformer 50. The output transformer 50 transforms the balanced signal of its input to an unbalanced signal at its output 52. The matching network 46, the amplifier stage 48 and the output transformer 50 form the output circuit.

Figure 3:
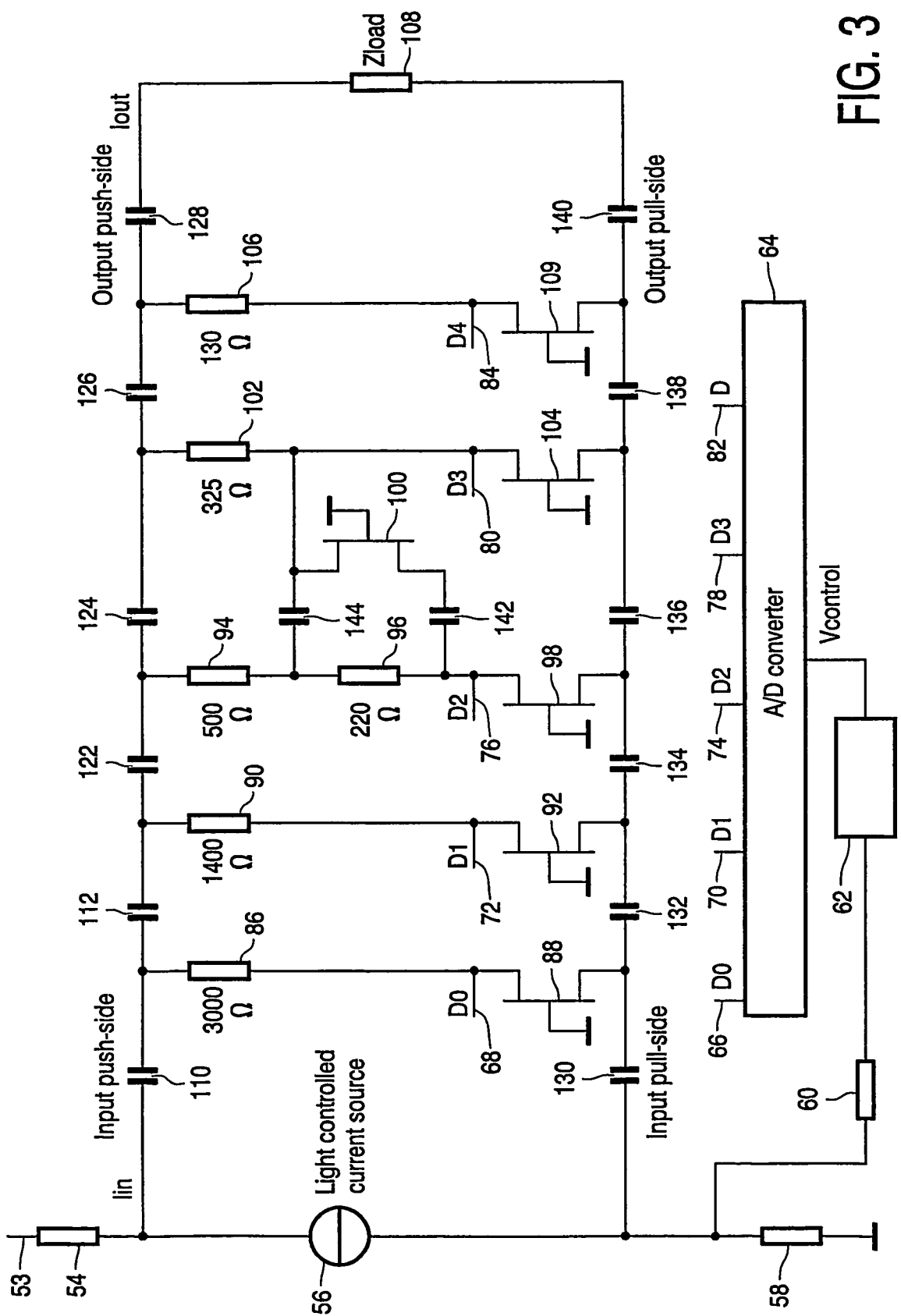
FIG. 3 shows a circuit diagram of the attenuator circuit according to the present invention.

FIG. 3 shows a circuit diagram of the attenuator circuit 44. A light-controlled current source 56, represented by a photodiode, is connected in parallel with two input terminals of the attenuator circuit 44. A load impedance 108 (270 Ω) is connected to the output terminals of the attenuator circuit. In order to operate the light-controlled current source 56, a resistor 54 is connected between a bias voltage supply and the light-controlled current source 56. On the other side of the light-controlled current source 56 a resistor 58 is connected between the light-controlled current source 56 and ground. Across the resistor 58 there is measured a voltage which is applied, via a resistor 60 and a comparator/level setting circuit 62, to an A/D converter 64.

The comparator/level setting circuit 62 forms a control voltage $V_{CONTR}$ for the A/D-converter 64. $V_{CONTR}$ determines the output signal of the A/D-converter 64 for the attenuation stages of the attenuation circuit 44. An output 66 of the A/D-converter 64 is coupled to a terminal 68 of a first attenuation stage. The first attenuation stage comprises a series connection of a resistor 86, having a resistance of 3000 Ω, and a MOSFET 88. The terminal 68 is connected between the resistor 86 and the drain of the MOSFET 88. The gate contact of the MOSFET 88 is connected to ground. The attenuation stage is connected in parallel with the light-controlled current source 56.

The light-controlled current source 56 and the first attenuation stage are separated by two capacitors 110 and 130. A terminal 70 of the A/D-converter 64 is coupled to a terminal 72 of a second attenuation stage. The second attenuation stage comprises a series connection of a resistor 90, having a resistance of 1400 Ω, and a MOSFET 92. The terminal 72 is connected between the resistor 90 and the drain contact of the MOSFET 92. The first and second attenuation stages are separated by capacitors 112 and 132.

The second attenuation stage is connected in parallel with the light-controlled current source 56. The gate contact of the MOSFET 92 is connected to ground. A terminal 74 of the A/D-converter 64 is coupled to a terminal 76 of the third attenuation stage. The third attenuation stage is connected in parallel with the light-controlled current source 56. The second and the third attenuation stages are separated by capacitors 122 and 134.

The third attenuation stage comprises a series connection of a resistor 94, having a resistance of 500 Ω, a resistor 96, having a resistance of 220 Ω, and a MOSFET 98. A terminal 76 is connected between the resistor 96 and the drain contact of the MOSFET 98. The gate contact of the MOSFET 98 is connected to ground. A further MOSFET 100 is connected in parallel with the resistor 96. The resistor 96 and the MOSFET 100 are separated by capacitors 142 and 144. The capacitor 142 is connected between the resistor 96 and the drain contact of the MOSFET 98. The capacitor 144 is connected between the resistor 94 and the resistor 96. The gate contact of the MOSFET 100 is connected to ground. The terminal 78 of the A/D-converter 64 is coupled to the terminal 80 of the fourth attenuation stage.

The fourth attenuation stage is connected in parallel with the light-controlled current source 56. The fourth attenuation stage comprises a series connection of a resistor 102, having a resistance of 325 Ω, and a MOSFET 104. The terminal 80 is connected between the resistor 102 and the drain contact of the MOSFET 104. The gate of the MOSFET 104 is connected to ground. The terminal 80 is connected between the resistor 102 and the drain contact of the MOSFET 104. The third and fourth attenuation stages are separated by the capacitors 124 and 136. The drain contact of the MOSFET 100 is connected to the terminal 80. A terminal 82 of the A/D-converter 64 is coupled to the terminal 84 of the fifth attenuation stage.

The fifth attenuation stage comprises a series connection of a resistor 106, having a resistance of 130 Ω, and a MOSFET 109. The fourth and fifth attenuation stages are separated by capacitors 126 and 138. The fifth attenuation stage is connected in parallel with the light-controlled current source 56. The gate contact of the MOSFET 109 is connected to ground. A terminal 84 is connected between a resistor 106 and the drain contact of the MOSFET 109. The fifth attenuation stage and a load 108 are separated by capacitors 128 and 140. The attenuation stages are set by the A/D-converter 64 in dependence on the value of $V_{CONTR}$ and the attenuation is, therefore, determined by the division of the current of the current source section 56 between the attenuation stages and the load 108. Furthermore, an advantageous feature of the attenuator circuit is that the attenuator circuit reduces the intermodulation distortion of the optical receiver.

The MOSFETS 88, 92, 98, 100, 104 and 109 are of the same type. This type of MOSFET has a high-ohmic resistance for a gate source voltage of 5 V and a low-ohmic resistance (around 10 Ω) for a gate source voltage of 0 V. For a gate source voltage of from 2 V to 2.8 V, the FET resistance increases linearly from a low-ohmic resistance to a high-ohmic resistance. After connection of the MOSFET in series with a resistor of, for example, 250 Ω, that is, between the push and the pull side, the responsivity of the optical receiver unit can be adjusted by means of an external voltage.

The attenuator circuit formed while using the above MOSFET shows that this field effect transistor can be used as a switch. A resistor can be connected or disconnected in the optical receiver circuit via a switch. Placing several switches with different resistor values in this module enables, a step attenuator to be built. Using a step size of 0.5 dB of electrical attenuation, the attenuator is adjusted every 0.25 dB step of optical input power. This means that with an increasing optical input power, the electrical output is a saw tooth signal of an amplitude of 0.5 dB (theoretically).

The function of the MOSFET 100 is more complex than the function of the other MOSFETs. The MOSFET 100 provides an attenuation of 6 dB by the resistor 102 (325 Ω), giving 4 dB attenuation, in parallel with the resistor 94 (500 Ω), giving an additional attenuation of 2 dB. The series connection of the resistor 94 (500 Ω) and the resistor 96 (220 Ω) provides an attenuation of 2 dB when the resistor 102 (325 Ω) is not connected. In order to have a difference between 500 Ω and 720 Ω, an additional MOSFET 100 is used to short-circuit the resistor 96 (220 Ω) in the case that the MOSFET 104 is activated (=attenuation>4 dB).

A distortion-free automatic gain control circuit can be realized by sensing the optical input power with the input of an A/D-converter 64 and switching the MOSFETS 88, 92, 98, 100, 104, 109 with the output of the A/D-converter 64. This circuit has a step size of 0.5 dB and a range of 9 dB.

This circuit is connected between the optical converter circuit 38 and the output circuit comprising the matching network 46, the amplifier stage 48 and the output transformer 50. The signals in the attenuator circuit are balanced. The attenuator circuit is connected between the push and the pull side.

Figure 4:
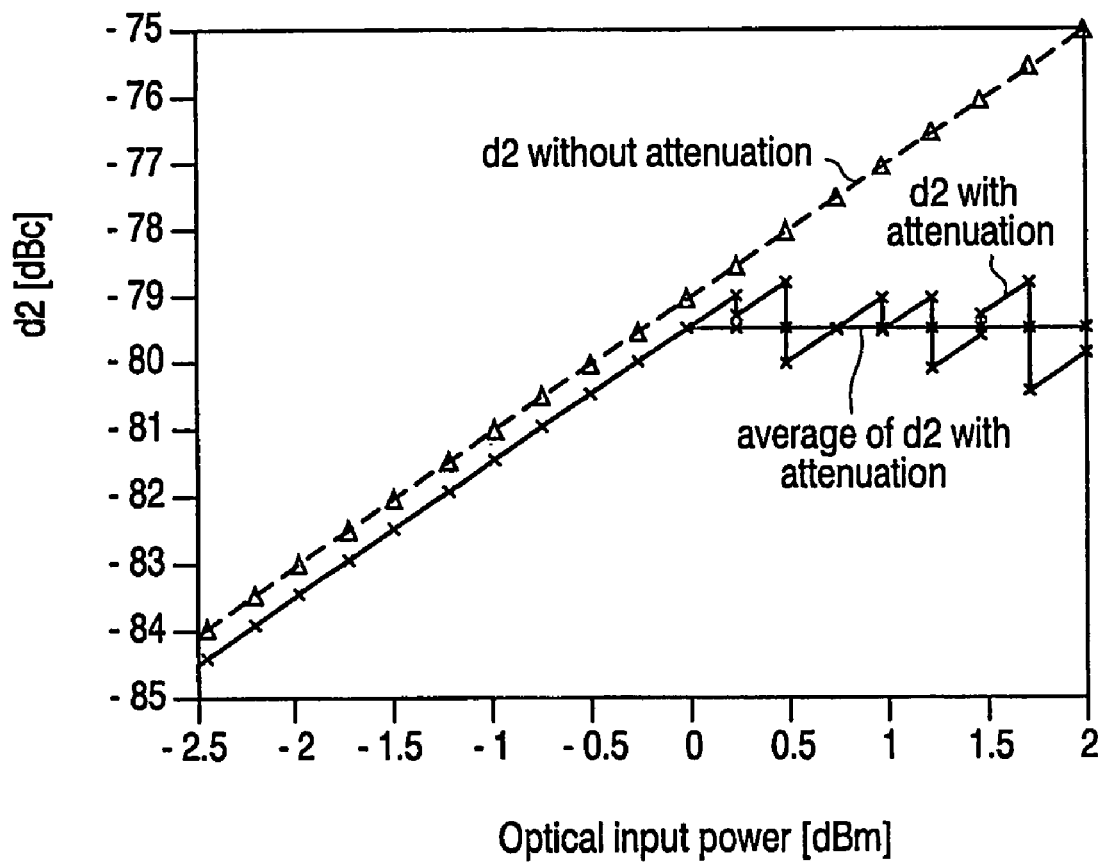
FIG. 4 shows a graph of the second-order distortion (d2) as a function of the optical input power.

FIG. 4 shows a graph of the second order distortion (d2) in dBc as a function of the optical input power in dBm. The second order distortion (d2) is defined by the second-order distortion product which is the difference in dB between the peak level of an RF signal at the measurement frequency and the peak level of the signal at the measuring frequency caused by two CW signals having their second order modulation product (f1±f2) at the measuring frequency.

The curve "d2 without attenuation" rises linearly with a rising optical input power. The curve "d2 with attenuation" has a shape which rises to a maximum value and moves vertically down after reaching the maximum when the optical input power is increased further. The curve slope rises linearly until it reaches again a maximum value. After reaching the maximum value, the curve again descends vertically to another lower value in the case of a further increase of the optical input power and then the curve rises again. The average value of the described attenuation forms a horizontal line in the case of optical input power. This horizontal line is represented by the curve "average of d2 with attenuation".

The maximum value of the response above 0 dBm optical input power is 0.8 dBmV. The maximum value above 0 dBm optical input power is 1.6 dB. The response and the shape of the attenuation curve "d2 with attenuation" (both at low frequences are "as good as" constant above the threshold point. The actual attenuation value is equal to the attenuation of a standard part without gain control. Using the described optical receiver circuit with optical gain control which consists of a step attenuator, the optical receiver circuit can be designed with an optical adjustment range of, for example, 2 dB. The use of MOSFETS with a lower capacitance can improve the variation at the response curve as a function of the optical input signal level.

Novel characteristics and advantages of the invention covered by this document have been set forth in the foregoing description. It will be understood, however, that this disclosure is, in many respects, only illustrative. Changes may be made in details, particularly in matters of shape, size and arrangement of parts, without departing from the scope of the invention. The scope of the invention is, of course, defined in the appended claims.

The invention claimed is:

1. An optical receiver circuit comprising:

an optical converter circuit to convert optical power into electrical power;

a sensor circuit connected to the optical converter circuit, the sensor circuit to detect and output a characteristic value of the electrical power; and an attenuator circuit comprising a variable attenuation, the variable attenuation dependent on the characteristic value of the electrical power output by the sensor circuit, wherein the attenuator circuit is configured to provide a constant output signal level of the optical receiver circuit;

wherein the attenuator circuit comprises a step attenuator circuit comprising:

a plurality of cascaded attenuator stages, wherein each of the continuing stages comprises two resistors and a semiconductor switch in series with the resistors and another semiconductor switch connected to bridge one of the resistors; and capacitors to separate respective input ends of the attenuator stages, an input capacitor to connect an input end of the attenuator stages to an output of the optical converter circuit, and an output capacitor to connect an output of the attenuator circuit to a load impedance.

2. An optical receiver circuit according to claim 1, wherein the optical converter circuit comprises a photodiode.

3. An optical receiver circuit according to claim 1, wherein the sensor circuit comprises a resistor network connected to the optical converter circuit in order to derive a control voltage $V_{CONTR}$ as the characteristic value of the electrical power output by the optical converter circuit.

4. An optical receiver circuit according to claim 1, wherein the plurality of cascaded attenuator stages can be selectively switched to active states.

5. An optical receiver circuit according to claim 3, wherein the sensor circuit comprises an A/D converter to convert the control voltage $V_{CONTR}$ into a digital signal to control the attenuator stages of the attenuator circuit.

6. An optical receiver circuit according to claim 4, wherein the respective attenuator stages each have a different attenuation value.

7. An optical receiver circuit according to claim 1, wherein each of the attenuator stages comprises a resistor and a semiconductor switch in series with the resistor.

8. An optical receiver circuit according to claim 7, wherein the semiconductor switches comprise MOSFETs.

9. An optical receiver circuit comprising:

an attenuator circuit connected to an optical convener circuit, the attenuator circuit to receive an electrical signal from the optical converter circuit and to provide a constant output signal level of the optical receiver circuit, wherein the attenuator circuit comprises:

a plurality of cascaded attenuator stages to selectively attenuate an electrical signal from the optical converter circuit dependent on a characteristic value of an electrical power output by a sensor circuit, wherein at least one of the cascaded attenuator stages comprises:

a resistor and a semiconductor switch in series with the resistor;

another resistor, wherein the resistors are connected in series; and another semiconductor switch connected in parallel with the other resistor to bridge the other resistor; and a capacitor connected between adjacent attenuator stages to separate the adjacent attenuator stages.

10. The optical receiver circuit according to claim 9, further comprising an input capacitor to connect an input end of the attenuator circuit to an output of the optical converter circuit.

11. The optical receiver circuit according to claim 9, further comprising an output capacitor to connect an output of the attenuator circuit to an input of a matching network.

12. The optical receiver circuit according to claim 9, wherein each attenuator stage is connected in parallel with the optical converter circuit.

13. The optical receiver circuit according to claim 9, further comprising the optical converter circuit connected to an attenuator circuit, the optical converter circuit to convert optical power into the electrical power.

14. The optical receiver circuit according to claim 9, further comprising the sensor circuit connected to the optical converter circuit, the sensor circuit to detect and output the characteristic value of the electrical power.

15. The optical receiver circuit according to claim 14, wherein the sensor circuit comprises a resistor network connected to the optical converter circuit, the resistor network derive a control voltage $V_{CONTR}$ from the electrical power as the characteristic value of the electrical power.

16. The optical receiver circuit according to claim 15, further comprising an analog-to-digital converter connected to the sensor circuit, the analog-to-digital converter to convert the control voltage $V_{CONTR}$ to one of a plurality of digital signals, wherein each of the plurality of digital signals comprises a control signal for a respective attenuator stage of the attenuator circuit, wherein each of the attenuator stages has a different attenuation value.

* * * * *